3,663,513
POLYURETHANE ADHESIVE COMPOSITION
Seizi Kazama and Masamitsu Nakabayashi, Osaka, Japan, assignors to Takeda Chemical Industries, Ltd., Osaka, Japan
No Drawing. Filed Oct. 5, 1970, Ser. No. 78,162
Claims priority, application Japan, Oct. 6, 1969, 44/79,760
Int. Cl. C08g 22/22, 41/00
U.S. Cl. 260—75 NT       3 Claims

ABSTRACT OF THE DISCLOSURE

Adhesive composition which is particularly useful in bonding polyesters or polyolefines to themselves or to other substrates comprises per 100 weight parts of component (A) about 1 to about 30 weight parts of component (B), component (A) being a hydroxy terminated polyurethane prepolymer which is prepared by reacting a polyester diol having a molecular weight of about 500 to about 3000 with $\omega,\omega'$-diisocyanato dimethyl benzene in such a ratio that NCO/OH is about 1/1 to give an NCO-terminated prepolymer and reacting the prepolymer with a low molecular polyol having at least 3 OH groups per molecule in a ratio such that OH/NCO is about 3 to about 10, and component (B) being an NCO-terminated prepolymer which is prepared by reacting a low molecular polyol having at least 2 OH groups per molecule and having a molecular weight of lower than about 400 with an excess amount of $\omega,\omega'$-diisocyanato dimethyl benzene.

The present invention is concerned with an adhesive composition, particularly, useful for adhesion of articles made of polyesters, or polyolefines such as polyethylene and polypropylene.

Various kinds of articles (e.g. fibrous materials, fabrics, films, sheets, etc.) made of polyesters or polyolefines such as polyethylene and polypropylene have been prepared and widely put into practical use. Particularly, films or sheets made of polyethylene terephthalate have been used in various fields of arts taking advantage of their excellent physical and mechanical properties such as high mechanical strength, high resistability against light, oxygen, heat, chemicals, etc., and low gas permeability. But one serious defect of the polyesters such as polyethylene terephthalate and the polyolefines is that they are quite difficult to adhere strongly and tightly to each other or to other substrates such as rubbers, metals, plastics, woods, etc. Though many kinds of adhesive agents such as synthetic rubber types, polyester types, vinyl resin types, isocyanate types, etc. have been known, none of them is satisfactory for an adhesive agent for the articles made of polyesters or polyolefines. Among the known adhesive agents, isocyanate type has been considered to be the most suitable one for the polyester or polyolefine articles, and the most typical example of the isocyanate type adhesive agent is a combination of tolylene diisocyanate-trimethylol propane adduct (Desmodur 75, Bayer A.G., Germany) with tolylene diisocyanate-polybutylene adipate prepolymer or tolylene diisocyanate-polyethylene adipate prepolymer (Desmocoll 400, Desmocoll 176, Bayer A.G., Germany). However, even when this type of adhesive agent is used for adhesion of the polyester or polyolefine articles, only a poor adhesive force is observed.

In view of the aforementioned technical level, the present inventors have made extensive studies for finding an adhesive agent useful for adhesion of polyester or polyolefine articles, and have arrived at the present invention.

Thus, the principal and essential object of the present invention is to provide an adhesive composition which is capable of adhering strongly and tightly an article made of a polyester (e.g., polyethylene terephthalate) or a polyolefine (e.g., polyethylene and polypropylene) to another of the same material or to another substrate of different material.

The adhesive composition of the present invention comprises per 100 weight parts of the following component (A) about 1 to about 30 weight parts of the following component (B). Component (A) is a hydroxy-terminated polyurethane prepolymer which is prepared by reacting a polyester diol having a molecular weight of about 500 to about 3000 with $\omega,\omega'$-diisocyanato dimethyl benzene in a ratio such as NCO/OH is about 1/1 to give an NCO-terminated prepolymer and reacting the NCO-terminated prepolymer with a low molecular polyol having at least 3 OH groups per molecule in a ratio such that OH/NCO is about 3 to about 10. Component (B) is an NCO-terminated prepolymer which is prepared by reacting a low molecular polyol having at least 2 OH groups and having a molecular weight of lower than about 400 with an excess amount of $\omega,\omega'$-diisocyanato dimethyl benzene.

The polyester diol having a molecular weight of about 500 to about 3000, which is used in the production of component (A), can be prepared by reacting one or more glycols, such as aliphatic glycols (e.g., ethylene glycol, propylene glycol, butylene glycol, 1,6-hexylene glycol, diethylene glycol, triethylene glycol, dipropylene glycol, etc.) with one or more dicarboxylic acids (e.g. adipic acid, sebacic acid, maleic acid, fumaric acid, phthalic acid, isophthalic acid, etc.) or their acid anhydrides, or can be prepared by subjecting a lactone (e.g. caprolactone, methyl caprolactone, etc.) to a ring-opening polymerization by the use of a glycol (e.g. ethylene glycol, propylene glycol, butylene glycol, diethylene glycol, etc.). Detailed reaction techniques or conditions may be any of conventional ones described in prior publications (e.g. "High Polymers vol. XVI Polyurethanes: Chemistry and Technology Part I" (1962) by J. H. Saunders and K. C. Frisch, published by Interscience Publishers, New York, N.Y., USP 2,890,208, USP 2,977,885, USP 2,933,478, etc.).

The $\omega,\omega'$-diisocyanato dimethyl benzene (which can be abbreviated as XDI) employed includes o-isomer, m-isomer, p-isomer and a mixture of two or more thereof.

The low molecular polyol used in the production of the component (A) is that containing at least 3, and more preferably 3 to 8 OH groups per molecule. The molecular weight of the low molecular polyol is not higher than about 400, more preferably about 90 to about 400. Typical examples of the low molecular polyol include trimethylol propane, 1,2,6-hexanetriol, glycerine, pentaerythritol, methyl glycoside, xylytol, sorbitol, sucrose, etc.

For the production of component (A), the polyester diol and the $\omega,\omega'$-diisocyanato dimethyl benzene are allowed to react with each other in such amounts that a ratio of NCO groups/OH groups is about 1, more particularly about 1.02 to about 1.10. The reaction is conducted at about 50 to about 100° C. in the absence or presence of an inert solvent such as aromatic hydrocarbons (e.g. benzene, toluene, xylene, etc.), halogenated hydrocarbons (e.g. methylene chloride, ethylene chloride, trichloroethane, chlorobenzene, etc.), esters (e.g. ethyl acetate, butyl acetate, Cellosolve acetate, etc.), ketones (e.g. acetone, methyl ethyl ketone, cyclohexanone, etc.), ethers (e.g. diisopropyl ether, tetrahydrofuran, dioxane, etc.), dimethyl formamide, and dimethyl acetamide. Thus, there is produced a linear polyisocyanate having two terminal NCO groups. Then, the polyisocyanate is reacted with the low molecular polyol in such an amount that a ratio of OH groups/NCO groups is 3 to 10, more preferably 4 to 10. The reaction is conducted at about 50 to about 100° C. For conducting this reaction, an inert solvent as mentioned above may be used. Use of a catalyst such as organic metal compounds (e.g. stannous octoate, dibutyltin dilaurate, ferric acetylacetonate, phenyl mercuric acetate, etc.) and tertiary amines (e.g. triethylamine, triethylene diamine, N-methylmorpholine, etc.) can accelerate the reaction. When the reaction is conducted in the presence of the solvent the amount of the solvent is adjusted in such a manner that the content of the product in the reaction solution is about 5 to about 90%, more preferably about 30 to about 50%, whereby there is given a reaction solution showing a viscosity of about 1000 to about 100,000 cps. In the component (A), there may be incorporated conventional antioxidants, ultraviolet ray absorbers, hydrolysis inhibitors, antiseptics, and the like up to about 5% relative to the solid content.

Turning to the component (B), the low molecular polyol for the production of the component (B) is that having at least 2 OH groups per molecule and a molecular weight of not higher than about 400, preferably, about 400 to about 60. Typical examples of the polyol include aliphatic glycols (e.g. ethylene glycol, diethylene glycol, propylene glycol, butylene glycol, 2,2-dimethyl-1,3-propylene glycol, hexane diol, 2,2,4-trimethyl-1,3-pentane-diol, etc.), cycloaliphatic diols (e.g. 2,2,4,4-tetramethyl cyclobutane-diol, 1,3-cyclopentane diol, 1,4-cyclohexane diol, 1,4-bis(hydroxymethyl)cyclohexane, 4,4 - methylene-bis(cyclohexanol), etc.), aromatic glycols (e.g. 1,4-phenylene-bis($\beta$-hydroxyethyl ether), isopropylidene-bis($\beta$ - hydroxyethyl phenyl ether), etc.), polyalcohols (e.g. trimethyol propane, hexane triol, glycerine, pentaerythritol, methyl glycoside, xylytol, sorbitol, sucrose, etc.) and the like. The $\omega,\omega'$-diisocyanato dimethyl benzene is used in an amount which is in excess to the low molecular diol or polyol, and practically the two starting materials are used in such an amount that the ratio of NCO groups/OH groups is not less than about 1.5, preferably, about 1.5 to about 4, and more desirably about 1.8 to 3. The reaction is conducted at about 30 to about 100° C. in the presence or absence of an inert solvent as above mentioned. Organic metal compounds or tertiary amines as above mentioned may be used also in this reaction. In the above reaction, allophanate linkages can be produced by conducting at higher than about 100° C. or by using a catalyst (e.g. stannous octoate, phenylmercuric acetate, trimethylbenzyl-ammonium hydroxide, etc.), and furthermore, biuret linkages can be produced by adding an amine (e.g. ethylene diamine, hexamethylene diamine, butylamine, etc.) to the reaction system. When the above reaction is conducted in the presence of the inert solvent, the amount of the solvent is adjusted in such a manner that the resulting reaction solution shows a solid content of about 50 to about 90% and NCO content of about 5 to about 25 weight percent.

The thus produced components (A) and (B) are admixed with each other in such an amount that about 1 to about 30, and more desirably about 3 to about 15 weight parts of component (B) in terms of its solid content is used relative to 100 weight parts of component (A) in terms of its solid content. The total solid content of thus produced composition is practically adjusted to about 5 to about 30 weight percent. This adjustment is conducted by controlling the amount of the solvent of the component (A) and/or (B) or by adding a solvent to the composition or removing a portion of the solvent from the composition.

The adhesive composition of the present invention can be used for adhering articles (e.g. fibrous materials, fabrics, films, sheets, etc.) made of polyesters (e.g. polyethylene terephthalate, etc.) or polyolefines (e.g. polyethylene, polypropylene, etc.) to each other or to other substrates (e.g. rubber articles, metals, plastics, woods, etc.). The present composition can also be used as an adhesive agent for articles other than those described above. The technique for the adhesion of the articles by using the present adhesive composition may be any of conventional ones. For example, an article is immersed into the adhesive composition or the composition is applied on an article, followed by removing a part or all of the solvent, and thus treated article is put on a substrate or thus treated articles are piled on each other, followed by keeping standing or heating preferably under pressure.

As stated above, the present adhesive composition can adhere strongly and tightly the polyester or polyolefine articles to each other or to other substrates, and this high adhesive force cannot be attained outside of the techniques and/or conditions stated as above. The following is a detailed explanation thereof.

When the $\omega,\omega'$-diisocyanato dimethyl benzene is replaced by other isocyanate compound such as tolylene diisocyanate (TDI), diphenylmethane diisocyanate (MDI) and hexamethylene diisocyanate (HMDI) in the present composition, a high adhesive force cannot be attained. In other words, only $\omega,\omega'$-diisocyanato dimethyl benzene can realize the outstanding object of the present invention.

When the low molecular polyol having at least 3 OH groups per molecule, which is used for the production of the component (A), is replaced by low molecular diol, the resulting composition does not show a high adhesive force. Also in the case of the combination of polyurethane diol (OH terminated XDI-polybutylene adipate or XDI-polyethylene adipate prepolymer) and NCO-terminated XDI-trimethylol propane adduct, the object of the present invention is not realized.

When a large excess amount (e.g. NCO/OH is about 1.2 or higher) of $\omega,\omega'$-diisocyanato dimethyl benzene is used for reacting with the polyester diol upon the preparation of the component (A), the resulting adhesive composition does not show a high adhesive force.

In the preparation of the component (A), when the NCO-terminated prepolymer and the low molecular polyol having at least 3 OH groups per molecule are used for reacting with each other in such an amount that a ratio of OH/NCO is more than about 10, the resulting composition does not show high adhesive force, and when this ratio is less than about 3, there occurs gelation during the reaction and thus the object component (A) is not obtained.

When a ratio of the component (B) to component (A) is less than about 1/100 or more than about 30/100, the resulting composition shows only a poor adhesive force.

In the present invention, the component (A) is prepared by so-called two-step method. When a comopund corresponding to the component (A) is prepared by one-step method, i.e. by reacting $\omega,\omega'$-diisocyanato dimethyl benzene with a mixture of polyester diol and low molecular polyol having at least 3 OH groups per molecule, there occurs gelation during the reaction and thus the object compound cannot be obtained.

In the following experiments, "part(s)" means "weight part(s)" unless otherwise specified, and the relation between "weight part(s)" and "volume part(s)" is the same as that between "gram(s)" and "milliliter(s)."

EXPERIMENT 1

(A) Preparation of the component (A)

(i) Into a reaction vessel equipped with a thermometer, nitrogen gas inlet, a reflux condenser and a stirrer are charged 110 parts of dehydrated ethyl acetate, 98 parts of polybutylene adipate diol having a molecular weight of 1960 and 10 parts of $\omega,\omega'$-diisocyanato dimethyl benzene (a mixture of 70 weight percent of m-isomer and 30 weight percent of p-isomer), followed by stirring at 60° C. for 8 hours under nitrogen gas stream, whereby a viscous liquid is obtained. To the resultant are added 1.1 parts of trimethylol propane and 92 parts of ethyl acetate, and the whole mixture is kept at 60° C. for 2 hours, followed by cooling. This procedure gives a polyurethane polyol solution of solid content of 35 weight percent and viscosity of 6500 cps. at 25° C.

This product is referred to as component (A)–(i).

(ii) Into a similar reaction vessel to that of (i) are charged 115 parts of methyl ethyl ketone, 105 parts of polyester diol of molecular weight of 2150, which is prepared from adipic acid and a mixture of 6 mole parts of ethylene glycol and 4 mole parts of 1,4-butanediol, 9.7 parts of ω,ω'-diisocyanato dimethyl benzene (a mixture of 70 weight percent of m-isomer and 30 weight percent of p-isomer) and 0.5 part of phenyl mercuric acetate. The mixture is heated at 60° C. under stirring for 4 hours, and then to the resultant is added 1.4 parts of glycerine. To the mixture is further added 101 parts of toluene, and the whole mixture is heated at 60° C. under stirring for 2 hours, followed by cooling. This procedure gives polyurethane polyol solution of solid content of 35 weight percent and viscosity of 3200 cps. at 25° C.

This product is referred to as component (A)–(ii).

(B) Preparation of the component (B)

(i) Into a similar reaction vessel to that used in the preceding experiment are charged 25 parts of ethyl acetate and 60.6 parts of ω,ω'-diisocyanato dimethyl benzene (a mixture of 70 weight percent of m-isomer and 30 weight percent of p-isomer). To the mixture is added in one hour 14.4 parts of trimethylol propane with stirring at 50 to 70° C. under nitrogen gas stream, followed by keeping standing for 2 hours. This procedure gives polyurethane polyisocyanate of solid content of 75% and NCO content of 13.1%.

This product is referred to as component (B)–(i).

(ii) Into a reaction vessel are charged 66.1 parts of ω,ω' - diisocyanato dimethyl benzene (a mixture of 70 weight percent of m-isomer and 30 weight percent of p-isomer) and 8.9 parts of 1,2-propylene glycol, followed by heating at 120° C. with stirring under dry nitrogen gas stream for 8 hours. After cooling to 60° C., the resultant is diluted with 25 parts of ethyl acetate. This procedure gives polyurethane polyisocyanate of solid content of 75% and NCO content of 14.6%.

This product is referred to as component (B)–(ii).

(C) Preparation of adhesive compositions (i) Adhesive compositions of the present invention are prepared by mixing the component (A) and the component (B) in such a ratio as described in the following table:

| Adhesive composition No. | Component (part) | | | |
|---|---|---|---|---|
| | (A)–(i) | (A)–(ii) | (B)–(i) | (B)–(ii) |
| 1 | 100 | | 7 | |
| 2 | 100 | | | 5 |
| 3 | | 100 | 10 | |
| 4 | | 100 | | 4 |

(ii) Commercially available adhesive compositions:
(1) Desmocoll 400/Desmodure 75 composition
(2) Desmocoll 176/Desmodure 75 composition
(3) Epoxy type composition "Bond E–2" manufactured by Konishi-Gisuke-Shoten, in Japan
(4) Nitrile rubber type composition "Bond G–500" manufactured by Konishi-Gisuke-Shoten, in Japan
(5) Ester resin type composition "Ester-resin 30" manufactured by Toyoboseki Kabushiki Kaisha, in Japan
(6) Vinyl acetate type composition "Bond KE–60" manufactured by Konishi-Gisuke-Shoten, in Japan
(7) Neoprene type composition "Bond G–2" manufactured by Konishi-Gisuke-Shoten, in Japan (iii) As controls, the following adhesive compositions are prepared:

(1) A polyurethane polyol solution is prepared by the same manner as in the component (A)–(i) except that TDI (80 weight percent of 2,4-isomer and 20 weight percent of 2,6-isomer) is used in place of ω,ω'-diisocyanato dimethyl benzene. A polyurethane polyisocyanate is prepared by the same manner as in the component (B)–(i) except that TDI (80 weight percent of 2,4-isomer and 20 weight percent of 2,6-isomer) is used in place of ω,ω'-diisocyanato dimethyl benzene. 100 parts of the polyurethane polyol solution is mixed with 7 parts of the polyurethane polyisocyanate.

(2) A polyurethane polyol solution is prepared by the same manner as in the component (A)–(ii) except that TDI (80 weight percent of 2,4-isomer and 20 weight percent of 2,6-isomer) is used in place of ω,ω'-diisocyanato dimethyl benzene. A polyurethane polyisocyanate is prepared by the same manner as in the component (B)–(ii) except that TDI (80 weight percent of 2,4-isomer and 20 weight percent of 2,6-isomer) is used in place of ω,ω'-diisocyanato dimethyl benzene. 100 parts of the polyurethane polyol solution is mixed with 4 parts of the polyurethane polyisocyanate.

(D) Test of adhesive force

Adhesive force of the above adhesive compositions is tested by the following method:

An adhesive composition is applied on the surface of a polyethylene terephthalate film (thickness: 75μ) to form an adhesive layer of 10μ thereon, followed by pre-drying. Two sheets of thus treated polyethylene terephthalate films are piled in such a manner that the respective adhesive layers are contacted with each other. The piled film is heated under pressure of 3 kg./cm.$^2$ to allow a curing reaction to take place. After keeping at room temperature for 24 hours, the resultant is cut into a sheet (200 x 25 mm.). On thus prepared test piece, T-peel test is conducted after a test method of ASTM D1876–61 T by using a Tensilon testing machine at a loading rate of 20 cm./min. Result is described below.

(Peel strength is an average of 10 test pieces)

| Adhesive composition | Pre-drying | | Heating for curing | | Peel strength, g./cm. |
|---|---|---|---|---|---|
| | ° C. | Min. | ° C. | Min. | |
| Composition of the present invention: | | | | | |
| 1 | 25 | 10 | 120 | 5 | 1,700 |
| 2 | 25 | 10 | 120 | 5 | 2,500 |
| 3 | 25 | 10 | 120 | 5 | 3,200 |
| 4 | 25 | 10 | 120 | 5 | 3,500 |
| Commercially available composition: | | | | | |
| 1 | 25 | 10 | 120 | 5 | 520 |
| 2 | 25 | 10 | 120 | 5 | 330 |
| 3 | 25 | 40 | 100 | 60 | 320 |
| 4 | 80 | 40 | 150 | 30 | 450 |
| 5 | 80 | 40 | 100 | 30 | 650 |
| 6 | 80 | 40 | 100 | 30 | 3 |
| 7 | 80 | 40 | 150 | 30 | 820 |
| Control composition: | | | | | |
| 1 | 25 | 10 | 120 | 5 | 760 |
| 2 | 25 | 10 | 120 | 5 | 550 |

EXPERIMENT 2 [1]

(A) Preparation of the polyurethane prepolymer component (i) In the same reaction vessel as Experiment 1 are charged 110 parts of ethyl acetate, 98 parts of polybutylene adipate diol of molecular weight of 1960 and 10 parts of ω,ω'-diisocyanato dimethyl benzene (m-isomer/p-isomer: 70/30), followed by heating at 60° C. for 8 hours with stirring under dry nitrogen gas stream to give viscous liquid. To the liquid are added 0.8 part of 1,4-butane diol and 102 parts of ethyl acetate, followed by keeping at 60° C. for 2 hours and cooling. This procedure gives a polyurethane diol solution of solid content of 35% and viscosity of 7000 cps. at 25° C. This solution is referred to as component (A)–(i).

(ii) In the same reaction vessel as Experiment 1 are charged 115 parts of methyl ethyl ketone, 105 parts of ---
[1] In case of using XDI polyester polyurethane diol type adhesive composition.

polyester diol which is prepared from ethylene glycol and 1,4-butane diol (6:4) and adipic acid and has molecular weight of 2150, 9.7 parts of ω,ω'-diisocyanato dimethyl benzene (m-isomer/p-isomer: 70/30) and 0.5 part of phenyl mercuric acetate as a catalyst, followed by heating at 60° C. for 4 hours with stirring. The resultant is mixed with 0.9 part of 1,2-propylene glycol and 116 parts of toluene, and the whole mixture is heated at 60° C. for 2 hours with stirring, followed by cooling. This procedure gives a polyurethane prepolymer solution of solid content of 35% and viscosity of 400 cps. at 25° C. The product is referred to as component (A)–(ii).

(B) Isocyanate prepolymer component

As the isocyanate component, the component (B)–(i) of experiment 1 is used.

(C) Preparation of adhesive compositions

The adhesive compositions are prepared by mixing the two components as follows:

|  | Component (parts) | | |
|---|---|---|---|
|  | (A)–(i) | (A)–(ii) | (B)–(i) [1] |
| Adhesion composition number: | | | |
| 1 | 100 | 0 | 7 |
| 2 | 0 | 100 | 10 |

[1] Of Experiment 1.

(D) Test of adhesive force

Adhesive force of the compositions is tested by the same manner as in experiment 1. The result is an follows:

| Adhesive composition | Pre-drying | | Heating for curing | | Peel strength, g./cm. |
|---|---|---|---|---|---|
|  | ° C. | Min. | ° C. | Min. |  |
| 1 | 25 | 10 | 120 | 5 | 1,000 |
| 2 | 25 | 10 | 120 | 5 | 1,200 |
| Compsotitions of the present invention: | | | | | |
| No. 1 in Exp. 1 | 25 | 10 | 120 | 5 | 1,700 |
| No. 3 in Exp. 1 | 25 | 10 | 120 | 5 | 3,200 |

EXPERIMENT 3 [2]

(ii) In the same reaction vessel as in Experiment 1 are charged 202 parts of ethyl acetate, 98 parts of polybutylene adipate diol and 1.1 parts of trimethylol propane, followed by stirring. To the mixture is then added 10 parts of ω,ω'-diisocyanto dimethyl benzene (m-isomer/p-isomer: 70/30), followed by heating at 60° C. for 1.2 hours under nitrogen gas stream. The product thus obtained is gellated and cannot be used as an adhesive composition.

(ii) In the same reaction vessel as in experiment 1 are charged 115 parts of dehydrated methyl ethyl ketone, 101 parts of toluene, 105 parts of polybutylene adipate diol of molecular weight of 2050, and 1.4 parts of glycerine, followed by stirring. To the mixture is added the same XDI in the above test, and then 0.5 part of phenyl mercuric acetate as a catalyst. The whole mixture is heated at 60° C. for 1 hour, whereupon the reaction system becomes gell, and thus the product cannot be used as an adhesive composition.

EXPERIMENT 4 [3]

Various adhesive compositions are prepared by mixing the component (B)–(i) in Experiment 1 with a 10% trimethylol propane solution in ethyl acetate or with a 10% glycerine solution in methyl ethyl ketone at various ratios. By using these adhesive compositions, the same test as in Experiment 1—(D) is conducted. Each of these compositions shows only 200 g./cm. or lower peel strength.

EXPERIMENT 5 [4]

In the same reaction vessel as in Experiment 1 are charged 110 parts of dehydrated ethyl acetate, 98 parts of polybutylene adipate diol of molecular weight of 1960 and 10 parts of the same XDI as previous test, followed by heating at 60° C. in nitrogen gas stream for the period as listed in the following table. To the resultant are added 0.8 part of 1,4-butane diol, and 102 parts of ethyl acetate, and the whole mixture is heated at 60° C. for 2 hours and cooling. The products show the following viscosity.

|  | Product number | | | | |
|---|---|---|---|---|---|
|  | 1 | 2 | 3 | 4 | 5 |
| Heating period (hr.) | 1 | 3 | 5 | 8 | 12 |
| Viscosity (cps. at 25° C.) | 200 | 800 | 3,000 | 6,700 | 16,480 |

100 parts each of the products is mixed with 7 parts of the component (B)–(i) in experiment 1 to give the adhesive compositions.

Adhesive force of the compositions is tested by the same manner as in experiment 1 to give the following result.

| Adhesive composition | Pre-drying | | Heating for curing | | Peel strength, g./cm. |
|---|---|---|---|---|---|
|  | ° C. | Min. | ° C. | Min. |  |
| Composition prepared from— | | | | | |
| Product 1 | 25 | 10 | 120 | 5 | 200 |
| Product 2 | 25 | 10 | 120 | 5 | 800 |
| Product 3 | 25 | 10 | 120 | 5 | 1,200 |
| Product 4 | 25 | 10 | 120 | 5 | 1,120 |
| Product 5 | 25 | 10 | 120 | 5 | 1,100 |
| Composition of the present invention: No. 1 in Exp. 1 | 25 | 10 | 120 | 5 | 1,700 |

EXPERIMENT 6 [5]

The polyurethane prepolymer composition of the component (A)–(i) in experiment 1 and the isocyanate prepolymer composition of the component (B)–(ii) in experiment 1 are admixed with each other at the ratios as listed below.

|  | Component (A)–(i) | Compone nt (B)–(ii) | Solid content ratio |
|---|---|---|---|
| Composition number: | | | |
| 1 | 100 | 0 | 100/1 |
| 2 | 100 | 0.4 | 100/0.7 |
| 3 | 100 | 2 | 100/4.3 |
| 4 | 100 | 5 | 100/10.7 |
| 5 | 100 | 10 | 100/21.4 |
| 6 | 100 | 15 | 100/32.3 |
| 7 | 100 | 20 | 100/42.8 |
| 8 | 100 | 50 | 100/107 |

Adhesive force of the compositions is tested by the same manner as in experiment 1 to give the following result.

| Composition number: | Pre-drying | | Heat for curing | | Peel strength, g./cm. |
|---|---|---|---|---|---|
|  | ° C. | Min. | ° C. | Min. |  |
| 1 | 25 | 10 | 120 | 5 | 150 |
| 2 | 25 | 10 | 120 | 5 | 500 |
| 3 | 25 | 10 | 120 | 5 | 2,100 |
| 4 | 25 | 10 | 120 | 5 | 2,500 |
| 5 | 25 | 10 | 120 | 5 | 2,200 |
| 6 | 25 | 10 | 120 | 5 | 1,000 |
| 7 | 25 | 10 | 120 | 5 | 500 |
| 8 | 25 | 10 | 120 | 5 | 500 |

---

[2] In case of preparation of the present composition by so-called one-step method.
[3] Low molecular polyhydroxy compound in place of the polyurethane prepolymer in the present composition.
[4] Of preparing the polyurethane prepolymer by using diol in place of polyol having at least 3 OH groups in the present composition.
[5] Influence of the ratio of Component (A)/Component (B) in the adhesive composition of the present invention.

EXPERIMENT 7 [6]

Using as an adhesive agent the compositions Nos. 1 to 4 of the Experiment 1, adhesive force to polypropylene film (20μ thickness) is tested by a similar manner to experiment 1 to give the following result.

| | Pre-drying | | Heat for curing | | Peel strength, g./cm. |
|---|---|---|---|---|---|
| | °C. | Min. | °C. | Min. | |
| Composition number: | | | | | |
| 1 | 25 | 10 | 120 | 5 | 1,700 |
| 2 | 25 | 10 | 120 | 5 | 1,800 |
| 3 | 25 | 10 | 120 | 5 | 1,800 |
| 4 | 25 | 10 | 120 | 5 | 1,800 |

What is claimed is:

1. An adhesive composition, which comprises per 100 weight parts of component (A) about 1 to about 30 weight parts of component (B), component (A) being a hydroxy terminated polyurethane prepolymer which is prepared by reacting a polyester diol having a molecular weight of about 500 to about 3000 with ω,ω'-diisocyanato dimethyl benzene in such a ratio that NCO/OH is slightly more than 1/1 to give an NCO-terminated prepolymer and reacting the prepolymer with a low molecular polyol having 3 to 8 OH groups per molecule in a ratio such that OH/NCO is about 3 to about 10, and component (B) being an NCO-terminated prepolymer which is prepared by reacting a low molecular polyol having at least 2 OH groups per molecule and having a molecular weight of lower than about 400 with an excess amount of ω,ω'-diisocyanato dimethyl benzene.

2. An adhesive composition, which comprises per 100 weight parts of component (A) and about 3 to about 15 weight parts of component (B), component (A) being a hydroxy terminated polyurethane prepolymer which is prepared by reacting a polyester diol having a molecular weight of about 500 to about 3000 with ω,ω'-diisocyanato dimethyl benzene in a ratio such that NCO/OH is about 1.02 to about 1.10 to give an NCO-terminated prepolymer and reacting the prepolymer with a low molecular polyol having 3 to 8 OH groups per molecule and having a molecular weight of about 90 to about 400 in a ratio such that OH/NCO is about 3 to about 10, and component (B) being an NCO-terminated prepolymer which is prepared by reacting a low molecular polyol having 2 to 8 OH groups per molecule and having a molecular weight of about 60 to about 400 with ω,ω'-diisocyanato dimethyl benzene in a ratio such that NCO/OH is about 1.5 to about 4.

3. The adhesive composition of claim 1 wherein in said component (A) the ratio of said polyester diol to ω,ω'-diisocyanato dimethyl benzene is such that NCO/OH is about 1.02 to about 1.10.

References Cited

UNITED STATES PATENTS

| 3,012,987 | 12/1961 | Ansul | 260—45.4 |
| 3,509,232 | 4/1970 | Schollenberger | 260—858 |
| 3,143,517 | 8/1964 | Heiss | 260—77.5 X |
| 2,837,498 | 6/1958 | Ferstandig | 260—75 |
| 2,801,648 | 8/1957 | Anderson et al. | 138—74 |
| 3,094,495 | 6/1963 | Gemeinhardt | 260—2.5 |
| 3,271,352 | 9/1966 | Weinberg | 260—37 |
| 3,284,539 | 11/1966 | McElroy | 260—858 |

FOREIGN PATENTS

| 1,326,963 | 4/1963 | France | 260—77.5 |

DONALD E. CZAJA, Primary Examiner

H. S. COCKERAM, Assistant Examiner

U.S. Cl. X.R.

161—190; 260—31.2, 32.8, 858

---

[6] Adhesion of polypropylene film by using the present composition.